United States Patent
Warren et al.

(10) Patent No.: US 6,725,821 B2
(45) Date of Patent: Apr. 27, 2004

(54) APPARATUS AND METHOD FOR STARTING AN ENGINE

(75) Inventors: William S. Warren, Ann Arbor, MI (US); Jean Joseph Botti, Sevres (FR); James Patrick Waters, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 178 days.

(21) Appl. No.: 10/047,861

(22) Filed: Jan. 15, 2002

(65) Prior Publication Data

US 2002/0121256 A1 Sep. 5, 2002

Related U.S. Application Data

(60) Provisional application No. 60/273,191, filed on Mar. 2, 2001.

(51) Int. Cl.$^7$ .............................................. F02N 17/00
(52) U.S. Cl. ................................. 123/179.3; 123/182.1
(58) Field of Search ..................... 123/179.3, 179.28, 123/179.25, 179.26, 182.1

(56) References Cited

U.S. PATENT DOCUMENTS

| | | | |
|---|---|---|---|
| 4,346,773 A | 8/1982 | Hofbauer et al. | 180/165 |
| 4,699,097 A | 10/1987 | Tanaka et al. | 123/192 R |
| 4,711,207 A | 12/1987 | Bonvallet | 123/198 F |
| 5,467,748 A | 11/1995 | Stockhausen | 123/198 F |
| 5,598,814 A | 2/1997 | Schroeder et al. | 123/90.11 |
| 5,630,390 A * | 5/1997 | Tsunoda et al. | 123/195 P |
| 5,642,703 A | 7/1997 | Stockhausen et al. | 123/198 F |
| 5,934,263 A | 8/1999 | Russ et al. | 123/698 |
| 6,002,219 A | 12/1999 | Permuy | 318/139 |
| 6,011,377 A | 1/2000 | Heglund et al. | 318/701 |
| 6,034,492 A | 3/2000 | Saito et al. | 318/141 |
| 6,059,059 A | 5/2000 | Schmidt-Brucken | 180/65.3 |
| 6,125,808 A | 10/2000 | Timewell | 123/179.5 |
| 6,484,596 B2 * | 11/2002 | Puchas | 74/6 |
| 6,506,137 B2 * | 1/2003 | Guhr | 474/135 |
| 6,588,409 B2 | 7/2003 | Maloney et al. | |
| 6,609,582 B1 | 8/2003 | Botti et al. | |
| 6,609,989 B2 * | 8/2003 | Berger et al. | 474/134 |

* cited by examiner

*Primary Examiner*—John Kwon
(74) *Attorney, Agent, or Firm*—Jimmy L. Funke (57) ABSTRACT

An apparatus and method for starting an engine having a starter generator for providing a rotational force to a pulley in order to provide the necessary torque to start an engine. The starter generator also receives a rotational force to the pulley wherein the starter generator generates a current when the pulley receives the rotational force. A valve deactivation system reduces the compression in a cylinder of the engine, thereby reducing the torque required to perform a starting sequence of the engine, either permitting this apparatus to be applied to larger engines, lower ambient temperatures, or some combination thereof.

13 Claims, 7 Drawing Sheets

APPARATUS AND METHOD FOR STARTING AN ENGINE

CROSS REFERENCE TO RELATED APPLICATIONS

This application claims the benefit of U.S. Provisional Application, Serial No. 60/273,191, Attorney Docket No. DP-302111, filed on Mar. 2, 2001, the contents of which are incorporated herein by reference thereto.

TECHNICAL FIELD

The present invention relates to an apparatus and method for starting an internal combustion engine.

BACKGROUND OF THE INVENTION

Increased fuel efficiency has been a primary goal of most vehicle designs. In addition, and in order to meet this goal, vehicle designs have been implemented in order to provide a more efficient vehicle without having to sacrifice passenger comfort and satisfaction.

A typical internal combustion engine includes both a starter motor and a generator. The starter motor provides an engine cranking force to the flywheel of the engine in order to rotate the crankshaft and facilitate the movement of the pistons prior to the ignition of the engine.

The generator provides an electrical output in order to meet the vehicle loads as well as the charge the vehicle's battery. Generally, a rotational force is applied to a pulley of the generator in order to provide an electrical charge from the generator.

SUMMARY OF THE INVENTION

A dual function starter generator for starting the engine and for generating current for the electrical needs of the vehicle, the combination starting motor arrangement and generator cooperates with the engine during both initial starting and various running modes of the vehicle and engine.

More particularly, a motor vehicle has an internal combustion engine, a transmission, and a flywheel arranged between the engine and transmission for equalizing the non-uniformities of engine output torque.

The generator, which normally is specially and functionally separate from the electric starter, is combined in the present invention with the starter so as to form one structural unit. Moreover, the combined generator and starter is built into, and operates in conjunction with, a compression reduction system or valve deactivation system for reducing the required forces necessary for driving the crankshaft of the engine in order to start the engine.

The above-described and other features and advantages of the present invention will be appreciated and understood by those skilled in the art from the following detailed description, drawings, and appended claims.

DETAILED DESCRIPTION OF THE PREFERRED EMBODIMENT

Figure 1:
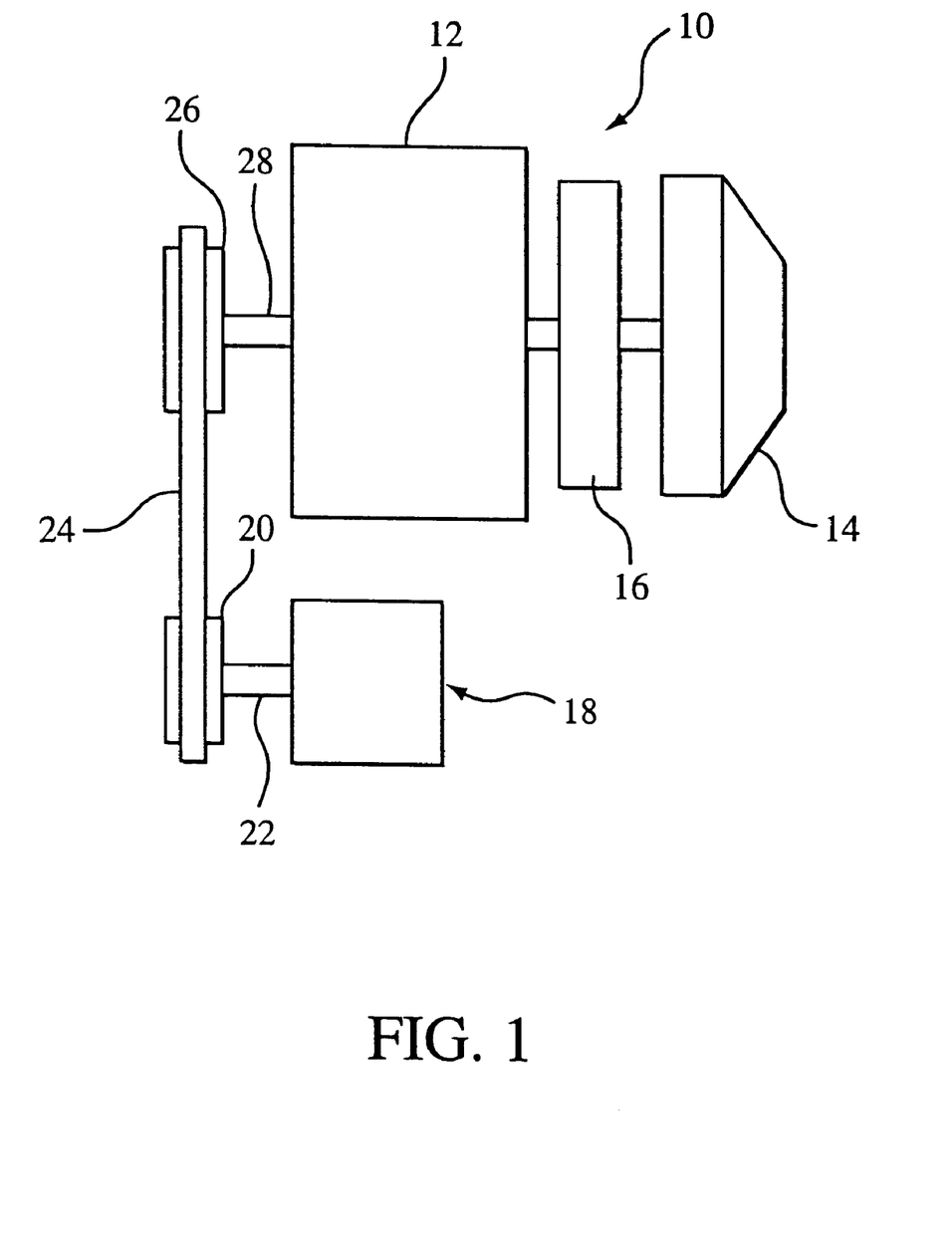
FIG. 1 is a schematic illustration of a vehicle propulsion system having a starter generator motor.

Referring now to FIG. 1, a vehicle propulsion system 10 is illustrated schematically. The vehicle proposed system includes an internal combustion engine 12, a transmission 14, a flywheel 16, and a starter generator 18. In accordance with an exemplary embodiment of the present invention, starter generator 18 performs the dual functions of providing an engine cranking force in order to start the internal combustion engine, as well as generating an electrical output in response to a rotational force received from engine 12 via a belt 24.

Prior ignition systems utilized two separate components, a starter motor and a generator, in order to provide the functions now provided by starter generator 18 of the present application. Here, starter generator 18 provides the necessary force to start the engine. In addition, and during the same starting function, a valve deactivation system is enabled to provide a compression release in order to lower the amount of torque that must be provided by starter generator 18 in order to start the vehicle engine.

Starter generator 18 has a pulley 20 secured to a shaft 22. Shaft 22 is mounted for rotation within housing of starter generator 18. A belt 24 is positioned to transfer forces between pulley 20 and a pulley 26 of engine 12. Pulley 26 is secured to a crankshaft 28 which is rotated in accordance with a rotational force provided by internal combustion engine 12. Accordingly, starter generator 18 and the valve deactivation system of an exemplary embodiment can be used with most current engine designs. Thus, starter generator 18 can be placed in the position typically used for an automobile generator. Therefore, there are no complicated design changes required for implementation of the method and apparatus disclosed herein.

Starter generator 18 is provided with switching electronics that allow starter generator 18 to either provide a rotational force to pulley 20 or convert a rotational force received from pulley 20 into an electrical output. In order to perform the latter, starter generator 18 is equipped with, among other elements, a rotor assembly, a stator, and a rectifier bridge necessary to provide a charging circuit, an excitation circuit, and a pre-excitation circuit in order to produce an electrical source. Of course, and as applications may require, starter generator 18 can be equipped with alternative means for producing an electrical current as a rotational force is applied to pulley 20.

Figure 2:
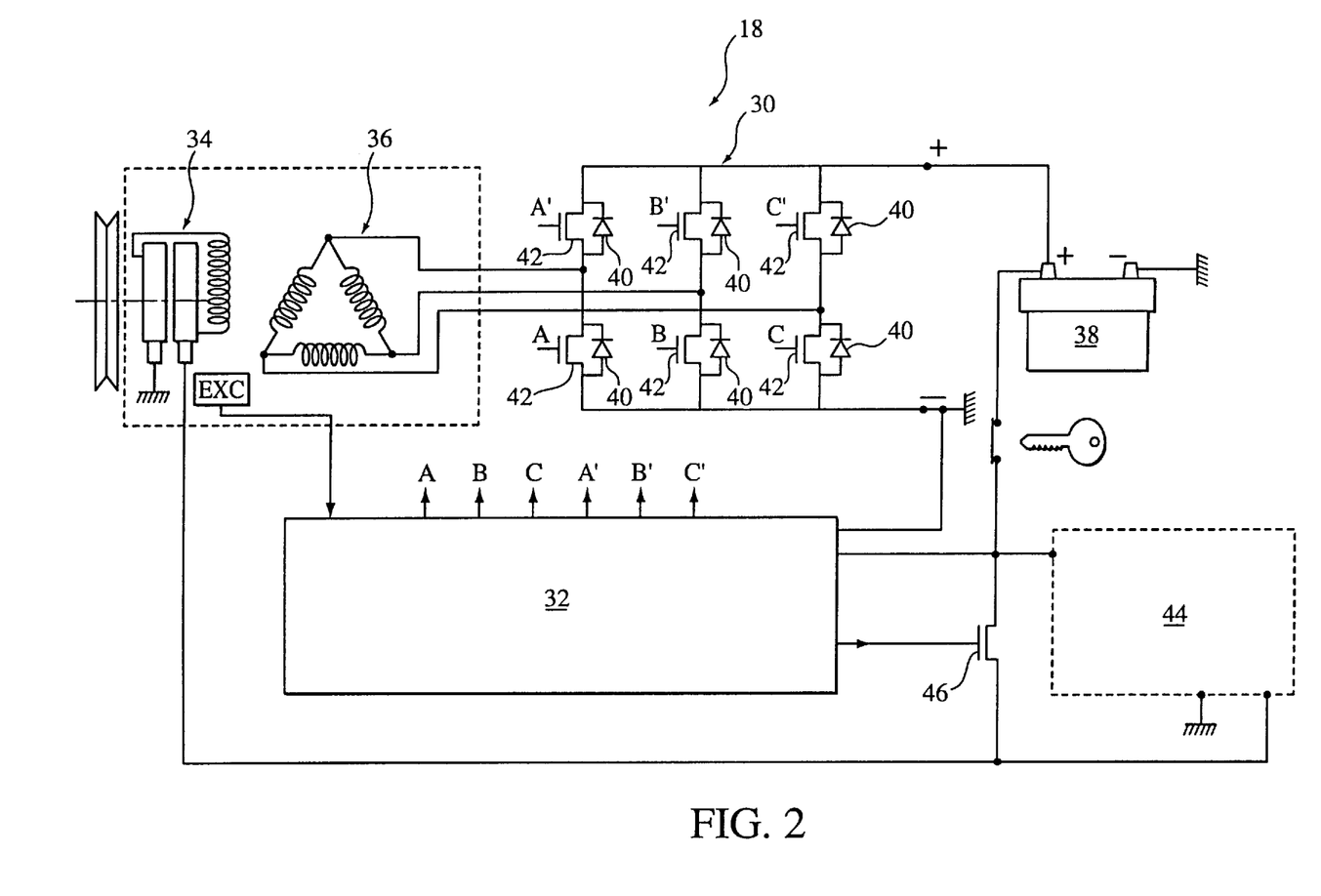
FIG. 2 is a schematic illustration of portions of a starter generator motor.

Referring now to FIG. 2, portions of starter generator 18 are shown. A three-phase rotary machine is shown comprising an alternator proper, a control, a rectifier bridge 30, and a unit 32 for controlling bridge 30.

Starter generator 18 includes a coil-carrying rotor 34 constituting the primary magnetic circuit associated with two rings and with two brushes that convey excitation current (of the order of a few amps); and a stator 36 carrying a plurality of coils constituting the secondary magnetic circuit, connected in star or delta configuration in the common case of a three-phase structure and acting, during alternator operation, to deliver converted electrical power to the rectifier bridge 30 (several tens of amps at a voltage of the same order as the battery voltage).

Bridge 30 is connected to the various phases of the secondary magnetic circuit 36 and is connected between ground and a power supply terminal of a battery 38 of a vehicle (not shown). It is constituted by a plurality of diodes 40 forming a rectifier bridge, and also by a plurality of switches such as transistors 42 that are connected in parallel with respective diodes 40 and which control the various phases of the alternator.

In motor mode, the diodes act as freewheel diodes, whereas in generator mode, they act as a rectifier bridge.

Transistors 42 are advantageously MOSFET type transistors. It will be observed that said transistors include, by construction, a diode between drain and source. Consequently they enable the rectifier and phase control bridge 30 to be implemented using transistor components only which then act both as switches and as freewheel diodes.

The motor mode operation of the alternator is achieved by imposing DC on the primary magnetic circuit 34 and by delivering signals that are phase-shifted by 120° to the phases of the stator, which signals are ideally sinewave signals, but may optionally be squarewave signals or trapezoidal wave signals.

Referring now to FIGS. 3–6, an example of a control sequence for the switches constituted by transistors 42 is illustrated. The sequence is made up of squarewave signals issued by the control unit. The signals A, B, and C shown in these figures are control signals for those of the transistors 42 in the bridge 30 which are connected to ground. The signals A', B', and C' which control the other transistors, i.e. those connected to the battery, are signals that are inverted relative to the signals A, B, and C, without overlapping them.

Figure 6:
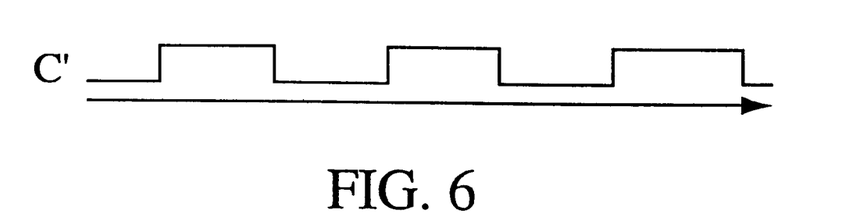

This is shown in FIG. 6 where the signal C' is drawn for controlling the transistor connected to the transistor controlled by the signal C.

With this kind of control, the rotor performs one full revolution while each of the phases goes through a number of periods equal to the number of pairs of poles of the rotor (e.g. eight).

This motor operation is used for driving the engine of the vehicle in order to start it, thereby making it possible, in comparison with conventional vehicles, to eliminate the starter and the associated drive ring, and also the power cabling generally associated with the starter.

To enable the engine to be started in this way, the control signals for transistors 42 are advantageously variable frequency signals, at a frequency which is regulated to be increasing by unit 32, so as to avoid any slip of the rotor relative to the rotating magnetic field created by the stator.

For example, frequency regulation may be provided by unit 32 in such a manner so as to guarantee that the alternator has a speed profile enabling the engine to be started.

Figure 3:
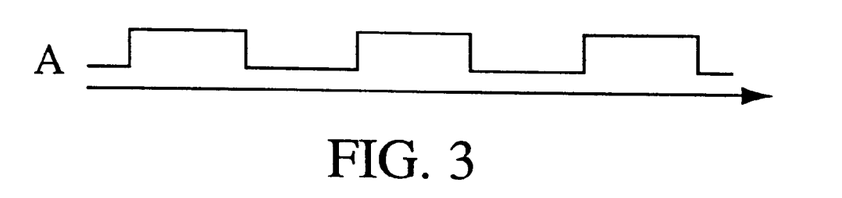
FIGS. 3–6 illustrate a control sequence for motor operation of the starter generator illustrated in FIG. 2.
Figure 4:
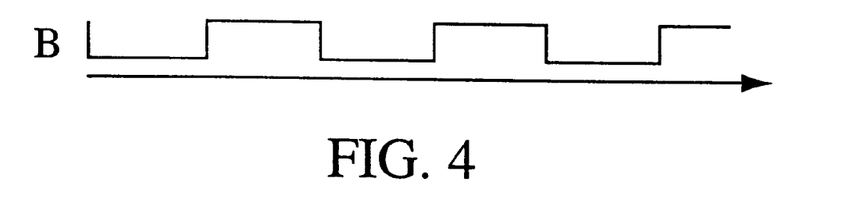
Figure 5:
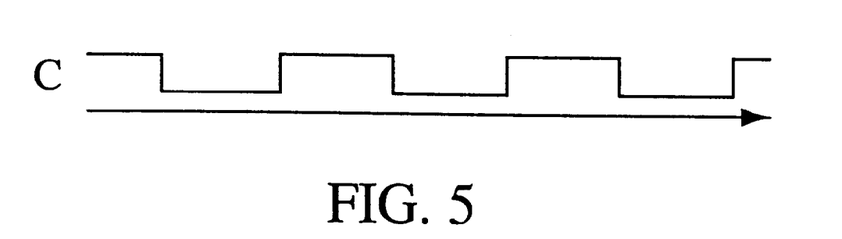

In accordance with the device of FIGS. 2 and 3, the control unit 32 includes a means for recognizing a code signal that authorizes engine starting. This signal is transmitted to the unit 32 by a code transmitter means inside the vehicle. The unit 32 switches on the transistors 42 in a manner suitable for starting the engine only if it receives the code signal. Consequently, the control unit 32 and the code transmitter means which transmit the unlocking signal to said unit, constitute a system for immobilizing the engine.

Immediately after the engine has started, unit 32 controls the transistors 42 so as to operate in alternator mode.

To this end, and in an implementation of the device of FIGS. 2 and 3, unit 32 controls the transistors 42 50 that all of them are open circuit across the terminals of all of the diodes.

The bridge 32 then reverts to being a conventional rectifier bridge.

In another possible embodiment, the transistors 42 are controlled so as to short circuit the conductive diodes. They are caused to be open circuit only across the terminals of non-conductive diodes.

Thus, a current no longer passes through the conductive diodes, such that the short circuits made in this way serve to reduce losses.

To synchronize control of transistors 42 relative to the switching from the conductive state to the non-conductive state of diodes 40, unit 32 is connected to a means for detecting when diodes 40 pass from one state to another. By way of example, these means may be constituted by a sensor, such as a Hall effect sensor, for measuring the angular position of the rotor relative to the stator.

Such a sensor may also be used for determining the speed of the rotor, e.g. by counting pulses in a given time window, so as to enable the unit to detect that the engine has started and thus switch from operating in motor mode to operating in generator mode.

Also, and in a manner that is likewise known, means 44 are provided for regulating voltage so as to maintain the battery voltage at a suitable level.

Provision is also made for a switch 46, e.g. another MOSFET type switch, whose ON or OFF state is controlled by the control unit. This switch is designed to short circuit the regulator in motor mode so that the secondary magnetic circuit 36 is then directly excited by the battery voltage. The aforementioned device of FIGS. 2–6 is further described in U.S. Pat. No. 6.002.219. the contents of which was incorporated into provisional application No. 60/273.191. which the present application claims the benefit of.

Thus, and when starter generator 18 is in its starter mode, wherein a rotational force is applied to pulley 20 from starter generator 18, a resultant force is applied to pulley 26. Pulley 26 rotates the crankshaft of the internal combustion engine in order to facilitate the starting of the same.

The functions of the starting motor and the alternator have been combined into one unit. Thus, the need for a cranking motor has been eliminated. Accordingly, there is a resultant cost and weight savings in the construction of the vehicle.

In an exemplary embodiment, the new device is belt driven similarly to an alternator of an automobile and driven off the accessory drive of the automobile engine.

In addition, and in accordance with an exemplary embodiment of the present invention and when starter generator 18 is operated in its starter mode, a valve deactivation system is enabled to provide a compression release keeping the exhaust valves open for the first few engine cranking revolutions of a cold start until the starter motor overcomes the sheer force of the cold, possibly waxed, engine oil, and the cranking rpm is sufficient for successful engine starting. Thus, starter generator 18 does not need to provide a high torque force to pulley 26. In addition, and when starter generator 18 is operated in its starter mode, a compression limiting system is enabled for the first few engine cranking revolutions of a cold start, thus easing the load on said generator.

Figure 7:
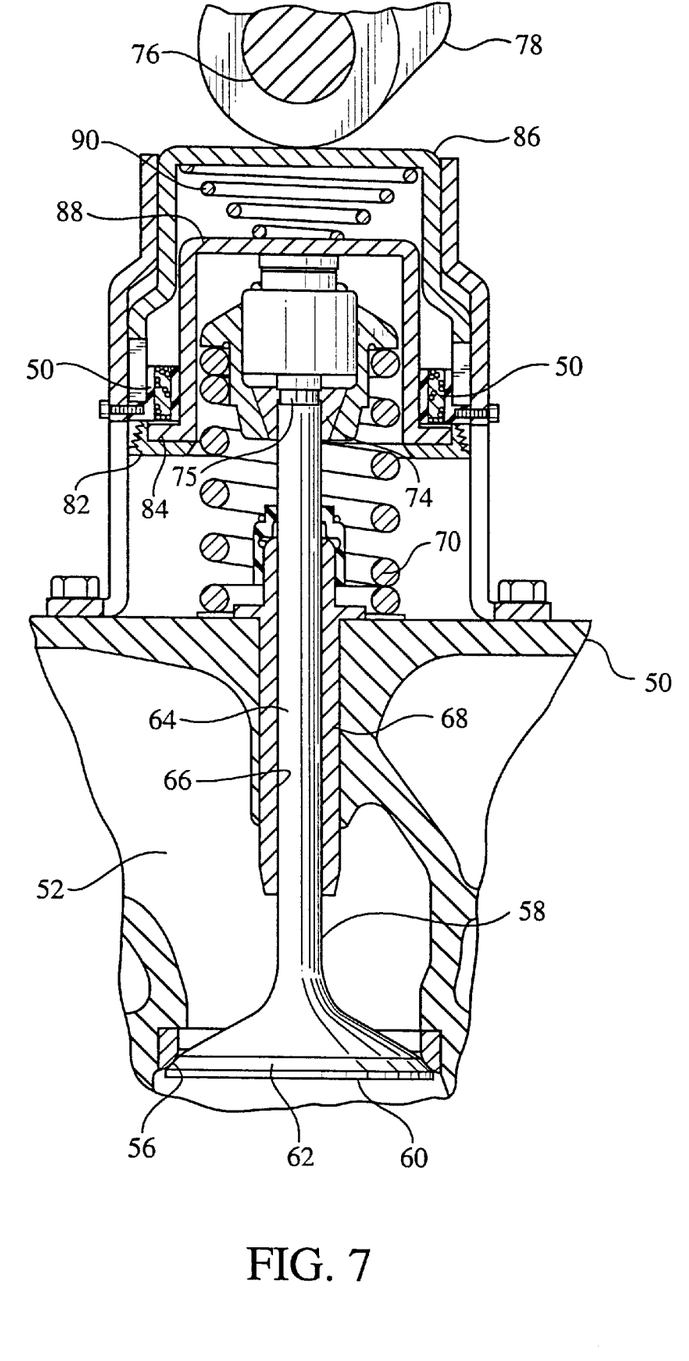
FIG. 7 is a schematic illustration of a cylinder deactivation system.

Referring now to FIG. 7, a valve deactivation system utilizing a solenoid coil is illustrated. As illustrated, a portion of an overhead cam type internal combustion engine having a cylinder block defining a cylinder (not shown), the cylinder block including a cylinder head 50 with a passage 52 therein, which may be an intake or exhaust passage, terminating at a port 54 encircled by a valve seat 56, that opens into the cylinder.

Flow through the port 54 is controlled by a poppet valve 58 having a head 60 with a seat 62 thereon for seating against the valve seat 56 and a valve stem 64 slidably supported in a valve guide bore 66, which in the construction shown is formed in a valve guide 68 suitably fixed in the cylinder head 50.

A valve return spring 70 bears at its upper end against a tubular, spring retainer 72 secured to the upper end of the valve stem 64 by split locks 74 engaged in the groove 75 of the valve stem 64 in a conventional manner.

An engine driven camshaft 76, having at least one cam 78 thereon, is rotatably supported in a conventional manner, not shown, at a predetermined distance above the upper end of the valve stem 64 to normally control the movement of the poppet valve 58 between a valve closed position, as shown in FIG. 7, and a valve open position relative to the valve seat 56.

During normal engine operation, a solenoid coil 80 will be continuously energized, as controlled by the electronic control unit, not shown, so that an electromagnetic field whose flux path passes through the opposed working surfaces of the flanges 82 and 84 (pole piece and armature, respectively) will cause the valve actuator to be magnetically coupled to the cam follower 86, so that during reciprocation of the cam follower by cam 78, the valve actuator 88 will also be reciprocated accordingly to control the opening and closing movement of the poppet valve.

Because spring 90 is operative to bias the flanges 82 and 84 so that a zero clearance exists at their interface, the solenoid coil, when energized, can generate the required electromagnetic force at relatively low power, to operatively maintain the cam follower and valve actuator electromagnetically connected together.

However, when it is desired to deactivate the poppet valve 58, the solenoid coil is deenergized, preferably as when this poppet valve 58 is in a valve closed position. This, in effect, will then uncouple the cam follower from the valve actuator so that the cam follower is free to reciprocate relative to the then stationary valve actuator, with the spring 90 still maintaining the cam follower 86 in operative engagement with the cam. However, even during reciprocation of the cam follower 86 in a downward direction, with reference to FIG. 7, so as to compress the spring 90, this bias force of spring 90 will still be less than the bias force of the valve return spring 70, whereby the poppet valve will remain in its valve closed position and, accordingly, this poppet valve is thus deactivated.

If the poppet valve is to be made operative again, the solenoid coil 80 can be again energized at any time as desired, but valve operation will only occur after the cam follower 86 again engages the base circle of the cam 78 so that the interface between the opposed working surfaces of the flanges 82 and 84 is again affected, whereby the cam follower 86 and valve actuator 88 will again be electromagnetically coupled together.

Alternatively, solenoid 50, cam follower 86, and valve actuator 88 are configured such that once solenoid 50 is energized, port 54 is opened, and thus the compression in the valve chamber is reduced. Further description of the valve deactivation system of FIG. 7 is at least found in U.S. Pat. No. 4,711,207, the contents of which was incorporated into provisional application No. 60/273.191, which the present application claims the benefit of.

Figure 8:
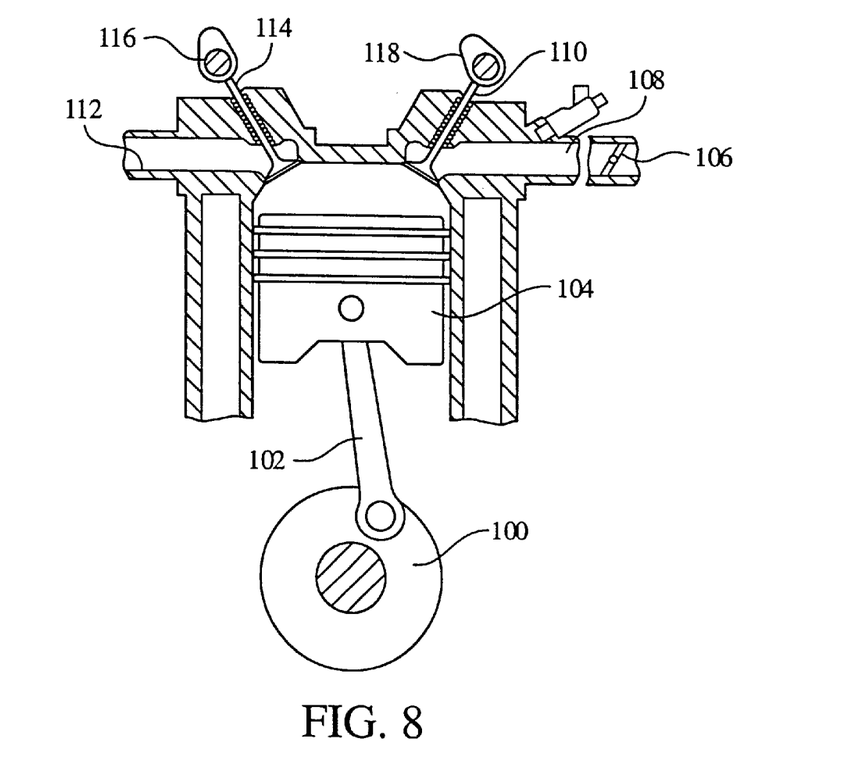
FIGS. 8 and 9 illustrate an alternative cylinder deactivation system.

Referring now to FIG. 8, an alternative means for cylinder deactivation is illustrated. A cylinder of a multi-cylinder, four-stroke cycle reciprocating internal combustion engine has crankshaft 100 with connecting rod 102 and piston 104. Air that has been regulated by throttle 106, located upstream of the cylinder, flows into the cylinder through intake port 108 which is controlled by intake valve 110. Exhaust gases exit the cylinder through exhaust port 112 after flowing past exhaust valve 114. Exhaust valve 114 is operated by exhaust camshaft 116. The ingress and egress of air into and out of the engine can be controlled by adjusting the timing of intake camshaft 118 and exhaust camshaft 116, respectively. The adjustment of timing of intake camshaft 118 and exhaust camshaft 116 will affect the cylinder pressures as piston 104 is moved by rod 102. When the timing of the intake and exhaust camshafts are adjusted to result in significant overlap near the top of the piston stroke, compression will be reduced as a portion of the air charge escapes into the exhaust and intake manifolds.

It is noted that FIG. 8 illustrates an engine having a dual overhead camshaft. However, as will be apparent to those skilled in the art, and in view of the present invention, a single overhead cam may be used to adjust the timing of both intake valve 110 and exhaust valve 114 in the same direction. Dual independent phasing can be achieved by two phasers on two camshafts.

Figure 9:
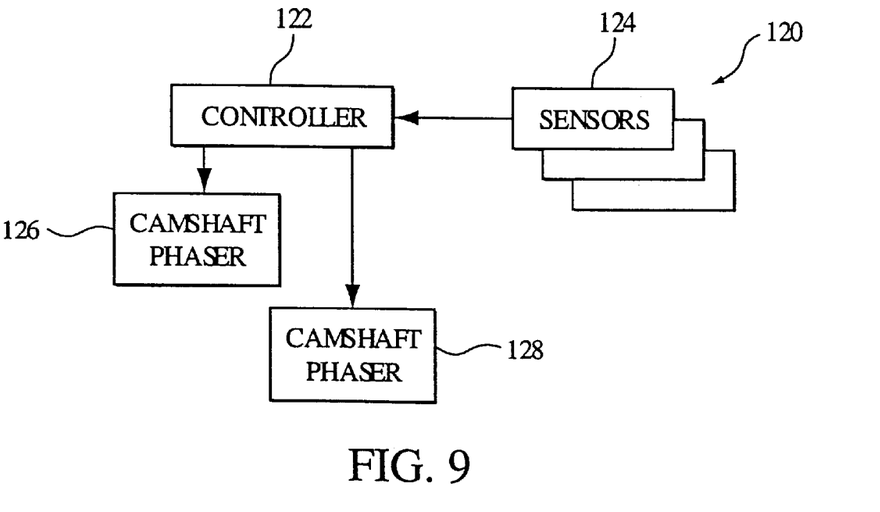
Figure 10:
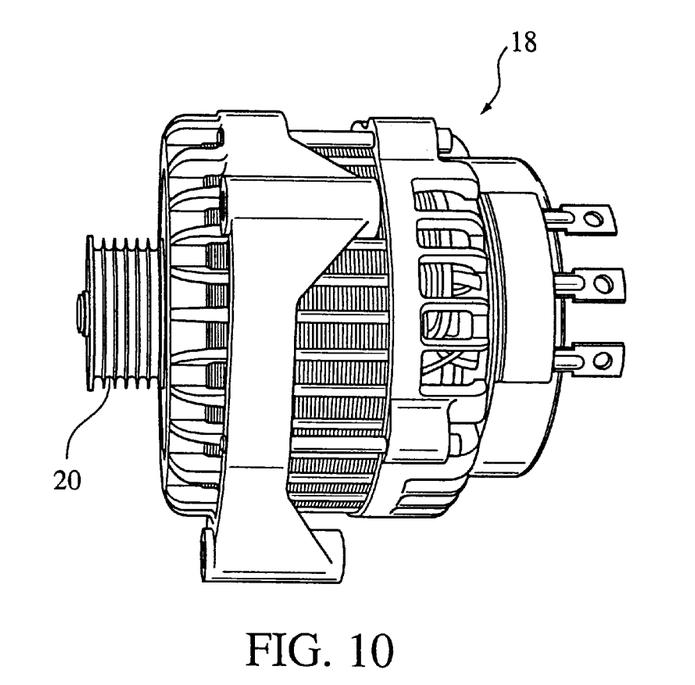
FIGS. 10 and 11 illustrate a starter generator motor.
Figure 11:
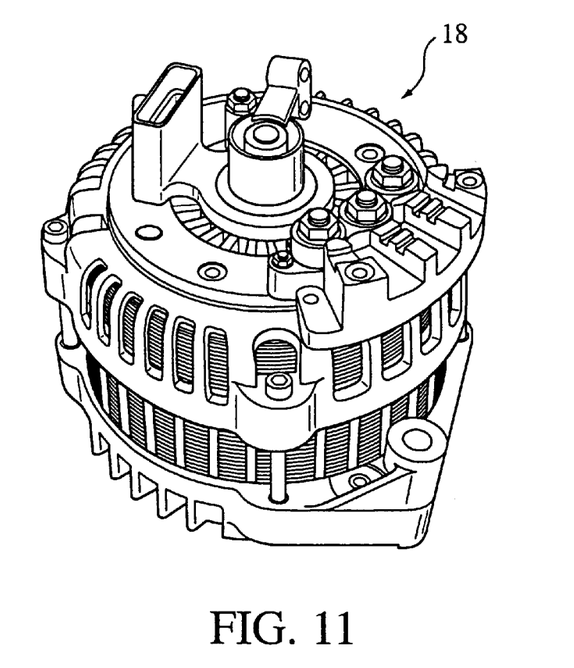

FIG. 9 illustrates a control system 120 for operating a cam phaser. Controller 122 receives a variety of inputs from engine operating sensors 124 which include many of the types of sensors known to those skilled in the art of engine control. Accordingly, sensors 124 may include engine speed, engine lead, intake manifold absolute pressure, engine intake air mass flow rate, engine temperature, vehicle speed, vehicle gear selection, throttle position, accelerator position, and other parameters known to those skilled in the art.

Controller 122, which may comprise an electronic engine operating controller drawn from many of the types known to those skilled in the art of automotive electronic engine controllers, is connected with camshaft phaser 126. A single camshaft phaser is required when using a single overhead cam to actuate both intake valve 110 and exhaust valve 114. However, in the case of a dual overhead cam, a second camshaft phaser 128 may be required. Alternatively, both camshafts may be linked together with one phaser.

Controller 122 compares sensed operating parameters with predetermined threshold values. For example, in a typical control algorithm, cylinder deactivation would not be used unless engine speed exceeds a minimum threshold value, and engine load is less than a minimum threshold value. In this sense, the term "exceed" is used herein to mean that the value of the sensed parameter may either be greater than or less than the threshold value. In the event that sensed parameters exceed threshold values, controller 122 will command camshaft phasers 126 and 128 to move to adjust or shift the timing of camshafts 118 and 116 which operate intake valve 110 and exhaust valve 114, respectively. Further description of the device of FIGS. 8 and 9 is at least found in U.S. Pat. No. 5,467,748.

In accordance with an exemplary embodiment of the present invention, the pressure within the chamber may be minimized through a means for detecting the position of the piston within the cylinder when the starter generator completes the stop phase of the engine. This would minimize the pressure peak within the chamber permitting the start of the engine during cold start, i.e. the valve could be put at the right position. For example, stopping the crankshaft a few degrees after top dead-center of the right cylinder enables the next starter cycle because rotational energy of this piston assembly enhances the ease of the starting of the engine.

Accordingly, and in accordance with an exemplary embodiment of the present invention, starter generator 18 provides a dual function (e.g. engine starting and current generating). During the engine starting function, a cylinder compression reduction system or valve deactivation system is utilized to reduce the necessary torque to drive a pulley connected to the engine crankshaft.

Figure 12:
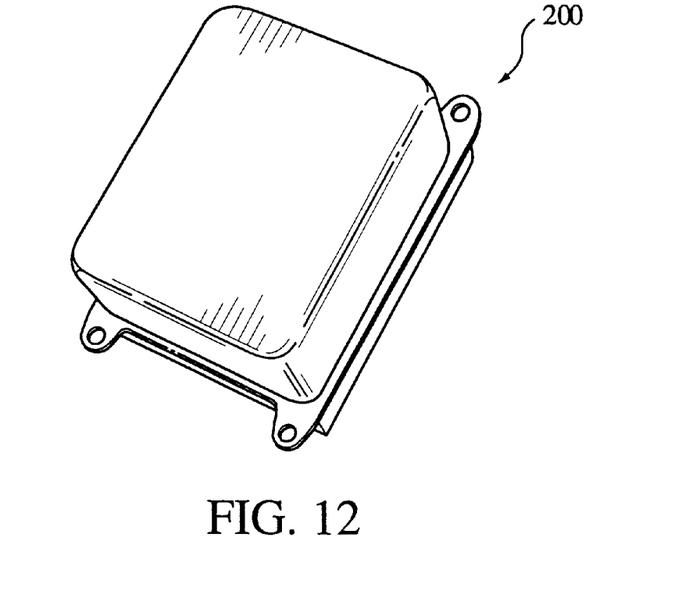
FIGS. 12 and 13 illustrate an engine control module for operating the starter generator motor and the valve deactivation system.
Figure 13:
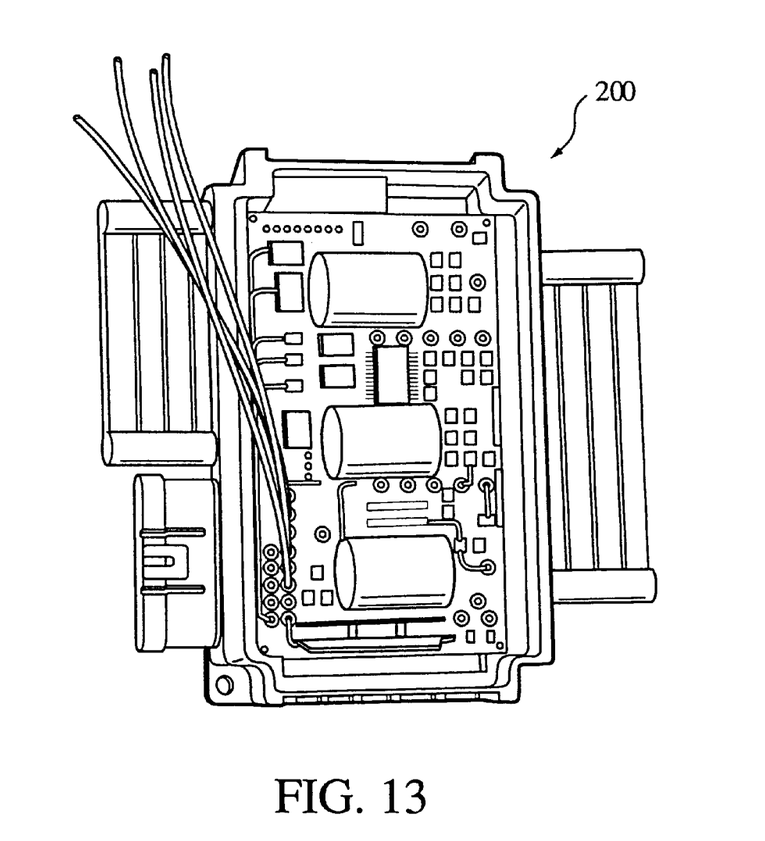

Activation of the starter generator 18 and the compression reduction system is facilitated through the use of an engine control module 200 (FIGS. 12 and 13). Engine control module 200 receives inputs from a plurality of sensors located throughout the vehicle in order to provide ECM 200 with a current vehicle status. Accordingly, and if the vehicle has been determined to be in an engine off mode and an operator is attempting to start the engine, ECM 200 will activate the compression reduction system in addition to placing starter generator 18 into a motor operating mode.

Once the engine achieves sufficient cranking RPM's, which is confirmed by inputs perceived by ECM 200, the engine control module deactivates the compression reduction system, enables fuel (and spark, if spark ignition engine), starts the engine, and converts the starter generator into a generator mode.

The use of the system allows starter generator 18 to have the size and weight roughly the same as current alternator designs. In addition, the crankshaft of the engine is driven through the frictional engagement of belt 24 which is configured to wrap around pulley 26 and pulley 20, thus allowing starter generator 18 to perform an engine cranking duty without making any significant changes to the current engine design.

Accordingly, manufacturing costs are reduced through the use of starter generator 18 which allows the engine to be constructed without a separate starter motor and complementary ring gear for the engine flywheel. In addition, the overall mass of the engine is reduced as there is no need for a starter motor, and through the use of a compression reduction system, the size of starter generator 18 can be kept relatively small.

Moreover, and since the starter generator 18 is much smaller than a flywheel and starter motor combination, the smoothing out of the port pulsations in engine will be achieved much faster than an engine system that utilizes a flywheel and starter motor combination.

Other alternative embodiments include electromagnetic valve train actuation or other means of individual valve motion control which would result in an exhaust valve deactivation, i.e., in a four-cylinder engine—open two valves, in a six-cylinder engine—open three valves, etc. This allows the starter generator to start a vehicle during cold start in the temperature range of −20 degrees Celsius without compressing the captured air.

The valve opening reduces the pressure into the cylinder chambers of the engine as such a work required to start engine would be reduced, w=(f/a)dx, where a is the face area of the piston. Fuel economy will be improved by taking advantage of the stop and start function provided by the starter generator when this takes place, and pumping losses of the engine will be reduced from operation of a cylinder deactivation system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. An apparatus for starting an engine of a vehicle, comprising:
    a) an electric machine being configured to provide a rotational force to a pulley and receive a rotational force to said pulley, said electric machine generating power when said pulley receives said rotational force;
    b) a belt for frictionally engaging said pulley of said electric machine and a crankshaft pulley of said engine, said crankshaft pulley being fixedly secured to a crankshaft of said engine; and
    c) a compression limiting system for limiting the compression of a cylinder of said engine when said electric machine rotates said crankshaft.

2. An apparatus as in claim 1, wherein said electric machine further comprises a rotor assembly fixedly secured to a shaft mounted for rotation within said electric machine, said shaft being fixedly secured to said pulley.

3. An apparatus for starting an internal combustion engine of a vehicle, comprising:
    a) an electric machine being mounted to said engine, said electric machine being configured to provide a rotational force to a pulley of said electric machine and being configured to receive and generate a current when a rotational force is applied to said pulley by said engine;
    b) a belt being configured, dimensioned, and positioned to frictionally engage said pulley of said electric machine and a crankshaft pulley of said engine, said crankshaft pulley being fixedly secured to a crankshaft of said engine; and
    c) a compression reduction system for reducing the compression in said engine when said electric machine provides a rotational force to said crankshaft pulley.

4. The apparatus as in claim 3, where in said compression reduction system opens an exhaust valve in a cylinder of said engine.

5. The apparatus as in claim 3, wherein said compression reduction system and said electric machine are controlled by an engine control module.

6. The apparatus as in claim 5, wherein said engine control module enables the compression reduction system and places said electric machine in a motor operating mode when an engine start has been detected by said engine control module.

7. The apparatus as in claim 3, wherein said compression reduction system comprises a valve deactivation system which is enabled during the first few cranking revolutions of the internal combustion engine to provide a compression release by keeping at least one exhaust valve open during said first few cranking revolutions.

8. The apparatus as in claim 7, wherein said valve deactivation system is enabled until the electric machine overcomes forces of the engine oil, and the internal combustion engine cranking rpm is sufficient start the internal combustion engine.

9. The apparatus as in claim 3, wherein said compression reduction system is operated by an engine control module that receives inputs from a plurality of sensors located throughout the vehicle in order to provide engine control module with a current vehicle status.

10. The apparatus as in claim 9, wherein said engine control module enables the compression reduction system and places said electric machine in a motor operating mode when an engine start has been detected by said engine control module.

11. The apparatus as in claim 9, wherein said engine control module deactivates the compression reduction system and places said electric machine in a generator mode when the internal combustion engine has started.

12. The apparatus as in claim 9, wherein the compression in said engine is reduced by detecting the position of at least one piston within at least one cylinder of said engine when said electric machine completes a stop phase of the engine, wherein said engine control module stops a crankshaft of said engine a few degrees after top dead-center of said at lest one cylinder.

13. The apparatus as in claim 3, wherein said internal combustion engine is capable of being started by said electric machine at temperatures as cold as −20 degrees Celsius without compressing captured air in at least one cylinder of said internal combustion engine.

\* \* \* \* \*